United States Patent Office 3,419,384
Patented Dec. 31, 1968

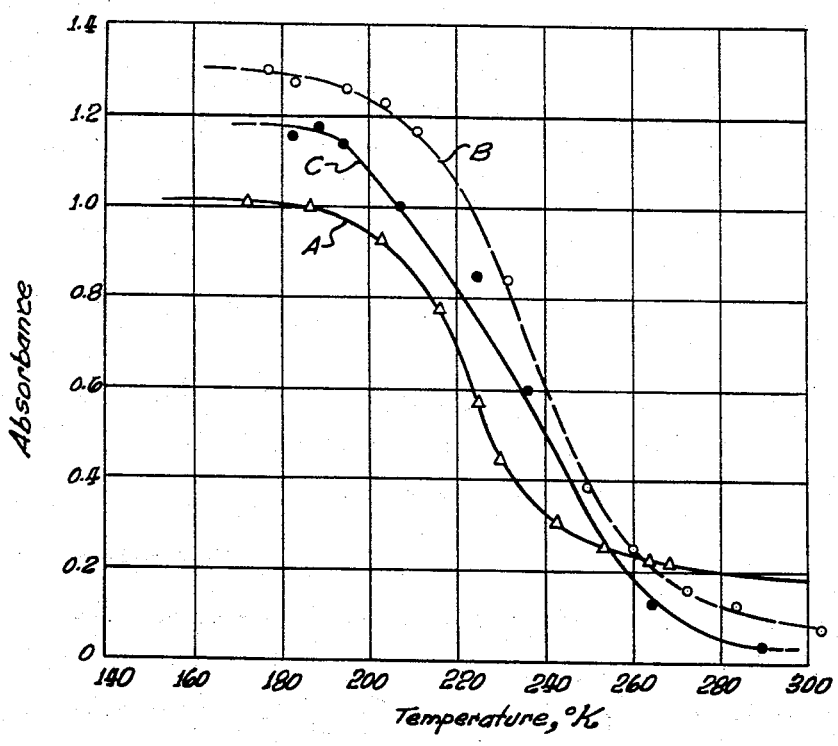

3,419,384
PREPARATION OF ALKALI METAL DISPERSIONS
Alan Rembaum and Robert F. Landel, Altadena, Calif., assignors to California Institute Research Foundation, Pasadena, Calif., a corporation of California
Filed Feb. 14, 1966, Ser. No. 527,331
8 Claims. (Cl. 75—66)

The invention described herein was made in the performance of work under a NASA contract and is subject to the provisions of Section 305 of the National Aeronautics and Space Act of 1958, Public Law 85–568 (72 Stat. 435; 42 U.S.C. 2457), as amended.

The present invention has to do with alkali metal dispersions and methods for their preparation.

The methods of the invention are capable of producing alkali metal dispersions of high purity, and are useful for purifying alkali metals as well as for dispersing them. The invention permits convenient control of the particle size over a wide range, including particle diameters as small as 1 micron or less.

It is known that certain aromatic hydrocarbons in a suitable organic solvent can be reduced to produce aromatic radical anions. Such reduction can occur at a dropping mercury polarographic electrode, or can result from interaction with metallic sodium or other alkali metal. Presence of the aromatic hydrocarbon anions can be detected by observing the extinction coefficient in visible light or by measuring the electron spin resonance, and a sharp qualitative dependence of the aromatic radical anion concentration upon temperature has been reported.

We have made a quantitative study of the equilibria between sodium and such substituted aromatic hydrocarbons by spectroscopic techniques, and have found that a drastic change in the equilibrium constant occurs over a relatively narrow temperature range, such as 50° C., for example. We have discovered, further, that this change in equilibrium is accompanied by a temperature-induced reversible precipitation of the alkali metal, and that such precipitation corresponds quantitatively to the changes in concentration of the aromatic radical anion.

In accordance with the present invention, alkali metal dispersions are prepared by varying the equilibrium solubility of the alkali metal in a suitable organic solvent in presence of aromatic hydrocarbons of the type referred to, the equilibrium variation being produced typically by simple change of temperature. The alkali metal is typically dissolved directly from the solid state at relatively low temperatures in the described organic medium, and precipitates as the temperature is raised. For example, such organic substances as N-ethyl carbazole and 4-ethyl biphenyl, when dissolved in tetrahydrofuran, dissolve sodium in substantially equimolar quantity at approximately −70° C., and the metal is quantitatively precipitated as the solution approaches room temperature. The size and uniformity of the particles of the resulting alkali metal dispersion is controllable over an appreciable range by variation of the rate of temperature change and the degree of agitation during precipitation.

The invention is useful in connection with all alkali metals with the single exception of lithium. Whereas lithium appears to be dissolved at reduced temperatures in solutions of the type that have been described, as indicated by the blue color characteristics of the aromatic hydrocarbon anion, warming of the solution fails to precipitate the dissolved lithium quantitatively, probably due to a side reaction between the lithium and aromatic hydrocarbon.

The present invention has the significant advantage that metal precipitation is obtained without evaporation of any solvent. After removal of the precipitate by filtration, the same filtrate can be reused to dissolve more metal in a continuous process.

The finely divided metal may be redispersed in conventional manner in a suitable non-reactive liquid medium, typically a liquid such as benzene or petroleum ether, for example, with or without emulsifying agents. Thus the invention permits the preparation of fine dispersions of alkali metals in a variety of suspending media.

During solution of the alkali metal that accompanies reduction of the selected aromatic hydrocarbon in solution, only the alkali metal dissolves. All commonly occurring impurities remain behind in the solid state and are readily removed by filtration in a preliminary step before precipitation of the alkali metal. Moreover, if the original metal should contain an impurity that is soluble in the organic solution at the low temperature of the alkali metal reaction, such dissolved impurity is retained in solution during precipitation of the alkali metal. The process of the invention thus leads to an exceptionally pure dispersion, constituting a simple and economical purification process.

Highly purified alkali metals are especially useful in the field of nuclear-electric power systems using liquid metal coolant and/or heat transfer loops. Such loops typically contain a sodium-potassium alloy, for example.

The method of the invention is also useful for coating pure alkali metals on a variety of solid substrates, such as silica gel, animal charcoal or graphite, for example, which may be directly immersed in the medium from which the alkali metal is precipitated. The relatively narrow range of temperature variation required for the present process is highly advantageous for such coating of materials that are temperature sensitive.

In the accompanying drawings:

FIG. 1 is a graph showing the temperature dependence of absorbance, due to aromatic radical anions of selected illustrative species, as a measure of dissolved sodium;

FIG. 2 is a schematic drawing representing illustrative apparatus for carrying out the invention in vacuum; and FIG. 3 is a schematic drawing representing illustrative apparatus for carrying out the invention at atmospheric pressure.

The practical effectiveness of the present method of producing alkali metal dispersions is well illustrated by the data represented in FIG. 1. Solutions of several aromatic species in a selected organic solvent were kept on a selected alkali metal at a low temperature for a time sufficient to allow all aromatic nuclei to acquire an extra electron. They were then separated from the solid alkali metal, filtered while still at that low temperature and sealed off from the reaction flask. An optical cell with optical path of 50 microns was then filled and the absorbance measured. Throughout this procedure the samples were not allowed to come into contact with air.

In FIG. 1, curve A shows the absorbance as a function of temperature in a $10^{-2}$ M solution of N-ethyl carbazole in tetrahydrofuran after contacting solid sodium at −70° C. The absorbance was measured at the wavelength of 390 millimicrons, which corresponds to one of the charge transfer bands of the aromatic anions.

Curves B and C were obtained in a similar manner, but show absorbance at 400 millimicrons as a function of temperature for $10^{-2}$ M solutions of 4-methylbiphenyl and of 4-ethylbiphenyl, respectively, in tetrahydrofuran in equilibrium with solid sodium.

Sodium titration has shown that the sodium concentration at the lowest temperatures shown corresponds to one atom of sodium for every aromatic unit present in the solutions, indicating that every aromatic unit has acquired an electron. Thus the graphs of FIG. 1 may be considered to represent directly the variation in concentration of dissolved sodium with temperature.

The figure thus reveals that a drastic change in alkali metal concentration occurs over a relatively narrow temperature range. In the particular curves illustrated, substantially the entire variation from the low temperature plateau, corresponding to a sodium ion present for every aromatic unit, to the high temperature level, corresponding to substantially zero sodium solubility, takes place within about 60° C. for N-ethyl carbazole and within about 70° C. for 4-methylbiphenyl and for 4-ethylbiphenyl. And essentially half of that variation takes place within a temperature interval of only 20° C. for N-ethyl carbazole, 25° C. for 4-methylbiphenyl and 35° C. for 4-ethylbiphenyl. The precise location of the transition region and the breadth of the temperature range it occupies are characteristic of the particular alkali metal and aromatic species selected.

Preparation of alkali metal dispersions in accordance with the present invention may conveniently utilize high vacuum apparatus and techniques of the general type described by A. V. Tobolsky, A. Rembaum and A. Eisenberg in Journal of Polymer Science, pages 347 to 366 (1960). Illustrative apparatus for the present purpose is shown schematically in FIG. 2. That apparatus comprises the three glass bulbs A, B and C. Bulbs A and B are rigidly connected by the glass tube 10, initially closed by a glass seal 12 which is breakable magnetically by means of the glass-enclosed stirring bar indicated at 14. Flasks B and C are rigidly connected by the glass tube 16, provided with the sintered glass filter 18 and the restricted portion 20 for sealing off bulb C under vacuum. Bulb A has a side arm 22 provided with a similar seal formation 24 and with a standard taper joint 26 at its end. Bulb B has a side arm 28, initially provided with a restriction and tapered joint similar to those of arm 22, but shown in FIG. 4 after having been sealed off at 29 by means of a gas-oxygen burner.

EXAMPLE 1

Approximately 0.2 g. of metallic sodium was placed in bulb B. Bulbs B and C were then thoroughly evacuated through arm 28 and sealed off at 29. Bulb B was gently heated to melt the sodium and produce a metallic film on the bulb wall. N-ethyl carbazole (0.001 mole gram) was placed in bulb A, which was then connected to a pumping system through the standard taper joint 26. Tetrahydrofuran (200 cc.) was distilled into bulb A under vacuum. After thorough degassing of the solution, the apparatus was sealed off at 24. The seal at 12 was then broken and the solution transferred into bulb B. That bulb was then cooled to −60° C. by means of a methanol Dry Ice bath. Reaction of the N-ethyl carbazole with sodium was indicated by the appearance of a dark blue color, and was continued for about two hours at −60° C. to −70° C. while stirring magnetically by means of the glass-enclosed iron bar 30. The solution was then separated from the remaining sodium metal and from any undissolved impurities by filtering through the sintered glass filter 18 into bulb C. After freezing its contents, bulb C was sealed off at 20 and thereby separated from the rest of the apparatus. On warming bulb C to room temperature at the rate of one degree per minute, a precipitate of finely divided sodium was formed. This could be completely redissolved by cooling the mixture to −70° C. The total amount of sodium in bulb C was determined by standard analytical methods and found to be equal to 0.023 g., corresponding to stoichiometric proportions of one mole gram of sodium to one mole gram of N-ethyl carbazole. Microscopic examination of a sample of the mixture removed from bulb C at room temperature showed particles down to the limit of resolution of the microscope, or approximately 1 micron.

EXAMPLE 2

The same as Example 1 except that 0.001 mole g. of 4-ethyl biphenyl was used in place of N-ethyl carbazole. Amount of sodium found in bulb C=0.023 g.

EXAMPLE 3

The same as Example 1 except that 0.001 mole g. of 4-methylbiphenyl was used in place of N-ethyl carbazole. Amount of sodium found in bulb C=0.023 g.

EXAMPLE 4

The same as Example 1 except that N-methyl carbazole was used instead of N-ethyl carbazole. Amount of sodium found in bulb C=0.023 g.

EXAMPLE 5

The same as Example 1 except that N-isopropyl carbazole was used instead of N-ethyl carbazole. Amount of sodium found in bulb C=0.020 g.

EXAMPLE 6

The same as Example 1 except that poly-N-vinyl carbazole was used instead of N-ethyl carbazole. Amount of sodium found in bulb C=0.018 g.

EXAMPLE 7

The same as Example 1 except that dimethoxyethane was used as a solvent instead of tetrahydrofuran. Amount of sodium found in bulb C=0.023 g.

EXAMPLE 8

The same as Example 1 except that potassium metal was used instead of sodium. Amount of potassium found in bulb C=0.039 g.

EXAMPLE 9

The same as Example 1 except that cesium metal was used instead of sodium. Amount of cesium found in bulb C=0.132 g.

EXAMPLE 10

The same as Example 1 except that the solution after reaction in bulb B was brought slowly to room temperature and the precipitate of sodium was collected on the sintered glass filter 18 during filtration. Tetrahydrofuran from the solution in bulb C was then distilled back into B by cooling the latter to −60° C. The sodium precipitate on filter 18 was washed by decanting that distilled tetrahydrofuran from B to C. The recovered sodium precipitate was found to be satisfactorily pure. In particular, the absence of the organic molecules taking part in the equilibrium was ascertained by reacting the prepared sodium with methanol (100 cc.); the solution when examined spectrophotometrically showed no absorption in the range of 220 to 650 mu, indicating that any organic material present was well under 0.01%.

EXAMPLE 11

The same as Example 10, except that the washed precipitate from filter 18 was suspended in approximately 5 ml. of petroleum ether, after opening the apparatus in an atmosphere of an inert gas.

A variety of organic solvents may be employed in the above examples in place of the dimethoxyethane of Example 7 and the tetrahydrofuran of the other examples, although those solvents are particularly satisfactory for the purpose.

In addition to the specific aromatic hydrocarbons represented by the above examples, further species are known to react with the alkali metals to produce aromatic radical anions, and such molecules can be employed for producing alkali metal dispersions in accordance with the the present invention. In particular, such species include lower alkyl biphenyls and aromatic hydrocarbons containing a lower alkyl substituted nitrogen atom as a heteroatom.

With suitably modified techniques all of the operations described above in Examples 1 to 10 may be carried out at atmospheric pressure in an inert atmosphere, such as helium, argon or nitrogen. Apparatus for that purpose is represented schematically in illustrative form in FIG. 3, which has been simplified by omission of valves and similar conventional elements. After charging vessel E with the selected alkali metal in solid form, and thoroughly flushing the apparatus with inert gas from 34, the selected organic solution, typically N-ethyl carbazole in tetrahydrofuran, is introduced from reservoir D to vessel E. Reaction occurs in E at low temperature produced by means indicated at 37. Reaction may be aided by stirring the solution, as by bubbling inert gas through a fritted glass filter 39.

On completion of the reaction, the cold alkali metal solution may be expelled from E via the outlet 36 by application of suitable inert gas pressure from 34. Such solution may be delivered to any desired destination, represented as vessel F. Alternatively, after reaction in E at reduced temperature, vessel E may be warmed approximately to room temperature to produce an alkali metal suspension, and the resulting suspension passed directly from E through the filter 38, the filtrate being collected in vessel G. That filtrate may then be returned to vessel E, which is again cooled to dissolve additional alkali metal. The process may thus be repeated many times, additional finely divided alkali metal being deposited on the filter during each cycle. Organic impurities can be removed from the filtered metal by refluxing over it the solvent from vessel G with the help of condenser 40.

It will be understood that filter 38 may be replaced, for example, by a centrifugal device that concentrates the alkali metal suspension to any desired extent for use or for further processing, without actual deposition of the metal particles. The small amount of organic reagent removed from the system with such concentrated suspension may be replaced after each cycle from reservoir D. If it is preferred to maintain vessel E continuously at the reduced reaction temperature, the resulting cold solution may be transferred to an intermediate vessel such as F, which has suitable provision for warming the solution at the desired rate and for transfer of the resulting suspension to suitable apparatus for such filtering, concentrating or other processing as may be desired.

The above description of procedures for carrying out the invention is intended only as illustration, and many modifications may be made without departing from the proper scope of the invention, which is defined in the appended claims.

We claim:

1. The method of obtaining finely divided alkali metal, comprising in combination the steps of
    contacting an alkali metal other than lithium with a solution of an alkyl substituted aromatic organic compound in an organic solvent that is capable of dissolving said compound and is essentially inert with respect to the alkali metal, said organic compound when so dissolved being capable of reacting with the alkali metal to form a radical anion with stoichiometric solution of alkali metal, the equilibrium constant of said reaction being inversely temperature dependent within a predetermined temperature range, said aromatic compound and alkali metal being incapable of side reactions within said temperature range,
    reacting the alkali metal and said solution at a first temperature in the lower portion of said range to dissolve alkali metal,
    raising the resulting solution to a second temperature in the upper portion of said range to precipitate alkali metal therefrom and thereby form a dispersion and recovering the precipitated alkali metal from the solution.

2. The method defined in claim 1, and wherein said alkyl substituted aromatic organic compound is selected from the group consisting of lower alkyl substituted N-carbazoles and lower alkyl substituted biphenyls.

3. The method defined in claim 1, and wherein said organic solvent is selected from the group consisting of tetrahydrofuran and dimethoxyethane.

4. The method defined in claim 1, and including
    filtering the produced dispersion to separate the precipitated finely divided alkali metal from the suspending solution,
    refluxing only the solvent component of the filtrate to wash the separated finely divided alkali metal,
    and resuspending the washed alkali metal in a liquid medium that is essentially inert with respect thereto.

5. The method of purifying alkali metal, comprising in combination the steps defined by claim 1, and including
    filtering the alkali metal solution while still essentially at said first temperature to remove any solid impurities,
    and filtering said produced dispersion to recover substantially pure alkali metal.

6. The method of producing a dispersion of finely divided alkali metal, comprising in combination the steps of
    contacting an alkali metal other than lithium at a temperature approximating −60° C. with a solution of an aromatic organic compound, selected from the group consisting of lower alkyl substituted N-carbazoles and lower alkyl substituted biphenyls, in an organic solvent that is capable of dissolving said compound and is essentially inert with respect to the alkali metal, said aromatic compound when so dissolved being capable of reacting at said temperature with the alkali metal to form a radical anion with stoichiometric solution of alkali metal and without side reactions,
    and raising the resulting solution to a temperature of approximately 0° C. to precipitate alkali metal essentially quantitatively therefrom and thereby form said dispersion.

7. The method defined in claim 6, and wherein said aromatic organic compound is N-ethyl carbazole.

8. The method defined in claim 6, and wherein said aromatic organic compound is ethyl biphenyl.

References Cited

UNITED STATES PATENTS

| 2,751,288 | 6/1956 | Corneil | 75—0.5 |
|---|---|---|---|
| 2,914,578 | 11/1959 | Nobis et al. | 260—665 |
| 3,111,543 | 11/1963 | Mador et al. | 260—665 X |
| 3,212,875 | 10/1965 | Strobel | 75—66 X |

OTHER REFERENCES

Hansley: Article in I & E Chemistry, August 1951, pp. 1759–1766.

L. DEWAYNE RUTLEDGE, *Primary Examiner.*

H. W. TARRING, *Assistant Examiner.*

U.S. Cl. X.R.

75—20; 260—665; 117—225